(12) United States Patent
Stanton

(10) Patent No.: US 8,818,727 B2
(45) Date of Patent: Aug. 26, 2014

(54) METHOD OF ASSISTING A USER OF A PERSONAL NAVIGATION DEVICE WITH PARKING NEARBY A DESTINATION LOCATION AND RELATED PERSONAL NAVIGATION DEVICE

(75) Inventor: Richard Stanton, Auckland (NZ)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 804 days.

(21) Appl. No.: 12/612,642

(22) Filed: Nov. 4, 2009

(65) Prior Publication Data

US 2011/0106435 A1    May 5, 2011

(51) Int. Cl.
*G01C 21/34* (2006.01)
*G01C 21/36* (2006.01)

(52) U.S. Cl.
CPC ........ *G01C 21/3679* (2013.01); *G09G 2380/10* (2013.01); *G01C 21/3605* (2013.01)
USPC .......................................... 701/533; 701/425

(58) Field of Classification Search
USPC .................. 701/533, 425, 428, 431, 433, 465
See application file for complete search history.

(56) References Cited

U.S. PATENT DOCUMENTS

| | | | |
|---|---|---|---|
| 5,410,485 A * | 4/1995 | Ichikawa ....................... | 701/428 |
| 6,269,303 B1 * | 7/2001 | Watanabe et al. ............. | 701/410 |
| 6,411,895 B1 * | 6/2002 | Lau et al. ....................... | 701/425 |
| 7,395,149 B2 | 7/2008 | Matsumoto | |
| 2001/0021894 A1 * | 9/2001 | Sakamoto et al. ............ | 701/209 |
| 2001/0025222 A1 * | 9/2001 | Bechtolsheim et al. ...... | 701/209 |
| 2005/0021227 A1 * | 1/2005 | Matsumoto et al. .......... | 701/207 |
| 2006/0178821 A1 * | 8/2006 | Brulle-Drews ............... | 701/209 |
| 2006/0195259 A1 * | 8/2006 | Pinkus et al. .................. | 701/211 |
| 2006/0253226 A1 * | 11/2006 | Mendelson ........................ | 701/1 |
| 2007/0038364 A1 * | 2/2007 | Lee et al. ....................... | 701/200 |
| 2009/0150073 A1 * | 6/2009 | Caraballo ....................... | 701/210 |
| 2009/0204319 A1 * | 8/2009 | Shanbhag et al. ............. | 701/201 |
| 2011/0077853 A1 * | 3/2011 | Ranford et al. ................ | 701/201 |
| 2011/0106426 A1 * | 5/2011 | Tertoolen ........................ | 701/201 |

FOREIGN PATENT DOCUMENTS

| | | |
|---|---|---|
| CN | 1948909 B | 5/2010 |
| CN | 101534315 B | 5/2012 |
| TW | 200829876 | 7/2008 |
| TW | I313348 | 8/2009 |

* cited by examiner

*Primary Examiner* — Joshua Rodden
(74) *Attorney, Agent, or Firm* — Winston Hsu; Scott Margo

(57) ABSTRACT

A method of assisting a user of a personal navigation device with parking nearby a destination location includes receiving instructions from the user to create navigation instructions to the destination location, determining that the destination location is in an urban area, querying whether the user requires parking, and presenting a plurality of nearby parking areas to the user when the user requests parking, receiving the user's choice of a selected parking area from the plurality of nearby parking areas presented to the user, and planning a route to the destination location using the selected parking area as an intermediate destination.

14 Claims, 4 Drawing Sheets

| Location | Streets/km² | Intersections/km² | Urban Area Indication |
|---|---|---|---|
| Concert Hall | 20 | 100 | Urban |
| Lake | 2 | 2 | Not urban |

FIG. 2

METHOD OF ASSISTING A USER OF A PERSONAL NAVIGATION DEVICE WITH PARKING NEARBY A DESTINATION LOCATION AND RELATED PERSONAL NAVIGATION DEVICE

BACKGROUND OF THE INVENTION

1. Field of the Invention

The invention relates to a personal navigation device, and more particularly, to a method of assisting a user of a personal navigation device with finding a parking area nearby a destination location and navigating from the parking area to the destination location.

2. Description of the Prior Art

Global Positioning System (GPS) based navigation devices are well known and are widely employed as in-car navigation devices. Common functions of a navigation device include providing a map database for generating navigation instructions that are then shown on a display of the navigation device. These navigation devices are often mounted on or in the dashboard of a vehicle using a suction mount or other mounting means.

The term "navigation device" refers to a device that enables a user to navigate to a pre-defined destination. The device may have an internal system for receiving location data, such as a GPS receiver, or may merely be connectable to a receiver that can receive location data. The device may compute a route itself, or communicate with a remote server that computes the route and provides navigation information to the device, or a hybrid device in which the device itself and a remote server both play a role in the route computation process. Personal GPS navigation devices are not permanently integrated into a vehicle but instead are devices that can readily be mounted in or otherwise used inside a vehicle. Generally (but not necessarily), they are fully self-contained—i.e. include an internal GPS antenna, navigation software and maps and can hence plot and display a route to be taken.

In a conventional personal navigation device, a user will input a destination location that he wishes to travel to, such as a concert hall at the center of town. Although the personal navigation device can provide the user with driving instructions on how to get to the concert hall, the user is still left with the problem of parking. At certain locations, especially those near a crowded downtown area, parking can be hard to find, and it can be especially hard to find parking on the premises of the location that the user wishes to travel to. The personal navigation device guides the user to the destination location, but the user ultimately has to find a suitable nearby parking area without the assistance of the personal navigation device. When the user is unfamiliar with the area surrounding the destination location, this can cause unnecessary stress for the user, and can even cause the user to run late due to the extra time that parking requires. In some instances, the user may not even be aware that parking will be difficult until the user arrives at the destination location, making it difficult for the user to determine when to start the trip to the destination location.

SUMMARY OF THE INVENTION

It is therefore one of the primary objectives of the claimed invention to provide a way to help users with finding parking nearby the destination location and then navigating from the parking area to the destination location.

According to an exemplary embodiment of the claimed invention, a method of assisting a user of a personal navigation device with parking nearby a destination location is disclosed. The method includes receiving instructions from the user to create navigation instructions to the destination location, determining that the destination location is in an urban area, querying whether the user requires parking, and presenting a plurality of nearby parking areas to the user when the user requests parking, receiving the user's choice of a selected parking area from the plurality of nearby parking areas presented to the user, and planning a route to the destination location using the selected parking area as an intermediate destination.

According to another exemplary embodiment of the claimed invention, a personal navigation device for assisting a user with parking nearby a destination location is disclosed. The personal navigation device includes a map database comprising map and address data, routing software for receiving instructions from the user to create navigation instructions to the destination location and determining that the destination location is in an urban area, and a user interface for querying whether the user requires parking, presenting a plurality of nearby parking areas to the user when the user requests parking, and receiving the user's choice of a selected parking area from the plurality of nearby parking areas presented to the user. A processor is used for controlling operation of the personal navigation device, and for executing the routing software for planning a route to the destination location using the selected parking area as an intermediate destination.

It is an advantage that the present invention assists users with parking near destination locations in urban areas where there may not be a parking area onsite. The personal navigation device can guide the user to the parking area and then guide the user to the destination location from the parking area. In addition, an estimated time of arrival can be calculated that takes the walking time from the parking area to the destination location into account for providing users with a more accurate estimate of the total time needed to arrive at the destination location.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a table showing properties of destination locations that indicate whether the destination locations are situated in urban areas or not.

DETAILED DESCRIPTION

Figure 1:
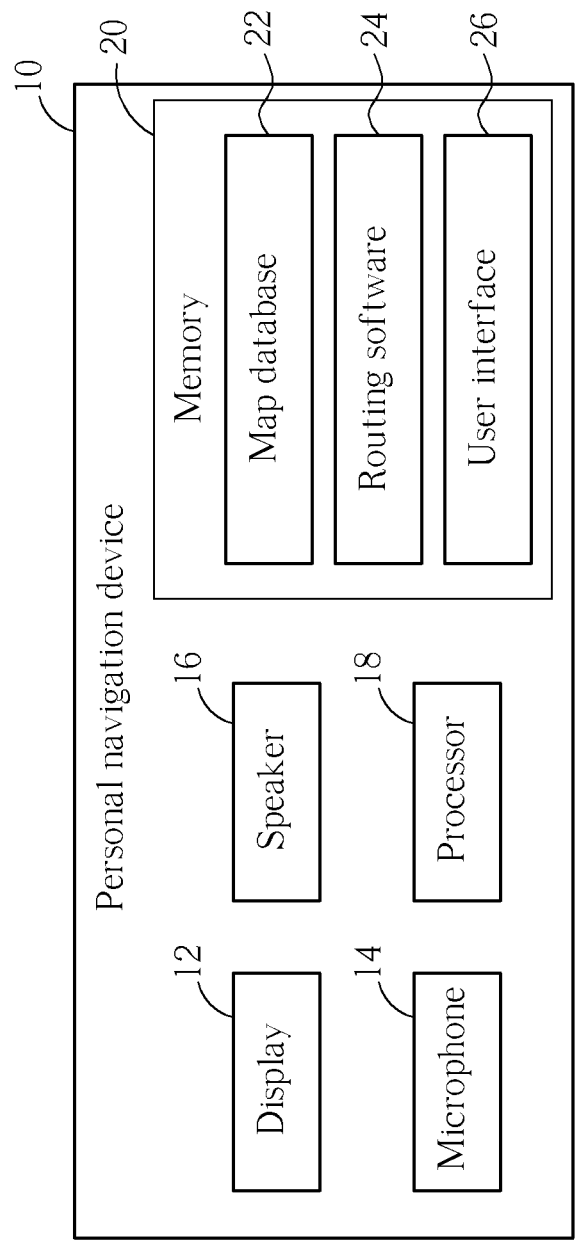
FIG. 1 is a functional block diagram of a personal navigation device according to the present invention.

Please refer to FIG. 1. FIG. 1 is a functional block diagram of a personal navigation device 10 according to the present invention. The personal navigation device 10 has a display 12, a microphone 14, and a speaker 16. The display 12 can be a touch-sensitive display for allowing a user of the personal navigation device 10 to input commands and data using the display 12. The personal navigation device 10 also contains a processor 18 for controlling operation of the personal navigation device 10 as well as executing routing software 24 stored in memory 20. The memory 20 also stores a map database 22 for storing map data, address data, parking area information, etc. The memory 20 also stores a user interface 26 for receiving user's input.

The present invention personal navigation device 10 helps the user by making it easy for the user to plan his journey to a destination location. The personal navigation device 10 recognizes that although the user ultimately wants to reach a particular destination location (such as the concert hall mentioned above), in reality the user will not be able to drive and park there, so what the user really needs is guidance to a parking facility first.

The need for parking assistance is greatest in urban areas since there is less space available for parking onsite. Therefore, different metrics can be used for determining whether an area is considered an urban area or not. Please refer to FIG. 2. FIG. 2 is a table 30 showing properties of destination locations that indicate whether the destination locations are situated in urban areas or not. The table 30 can be stored in the memory 20 as part of the map database 22 or in other sections of the memory 20.

One property that can be used to determine if a destination location is located in an urban area or not is the number of streets per unit area located within a predetermined radius of the destination location. The length of the predetermined radius can be set by the user of the personal navigation device 10. Another property that can be used to determine if a destination location is located in an urban area or not is the number of street intersections per unit area around the destination location. If the number of streets per unit area is greater than a first threshold or if the number of street intersections per unit area is greater than a second threshold, it can be concluded that the destination location is located in an urban area. Alternatively, the map database 22 can store an indicator that states whether the destination location is in an urban location or not. For example, in the downtown area of a large city, this indicator can state that all destination locations within the downtown area are considered to be in an urban area.

As shown in FIG. 2, two different locations are shown to give an example of a location that is in an urban area and a location that is not in an urban area. The first location, a "concert hall" is shown as having 20 streets and 100 street intersections per square kilometer in an area located within a predetermined radius of the concert hall. Please note that the predetermined radius can be set or modified by the user of the personal navigation device 10. For example, the user could make the radius smaller when the user wishes to walk less and wants the data to be more accurate on a smaller scale. Alternatively, the user may make the radius larger when the user expects that a parking space will not be easy to find without any assistance. The table 30 can also include an urban area indicator, which in this case states that the concert hall is in an urban area. The second location shown in FIG. 2, a "lake" is shown as having 2 streets and 2 street intersections per square kilometer in an area located within a predetermined radius of the lake. The urban area indicator for the lake also states that the lake is not in an urban area.

In the personal navigation device 10, the user is given a choice of guidance mode between driving mode and walking (pedestrian) mode. These options change the nature of the roads that can be selected for routing and the degree to which road rules such as one-way restrictions and blockages are applied during the route calculation. In one common scenario, the personal navigation device 10 will be in driving mode while guiding the user to the parking area, and then will be in walking mode when guiding the user from the parking area to the destination location.

Figure 3:
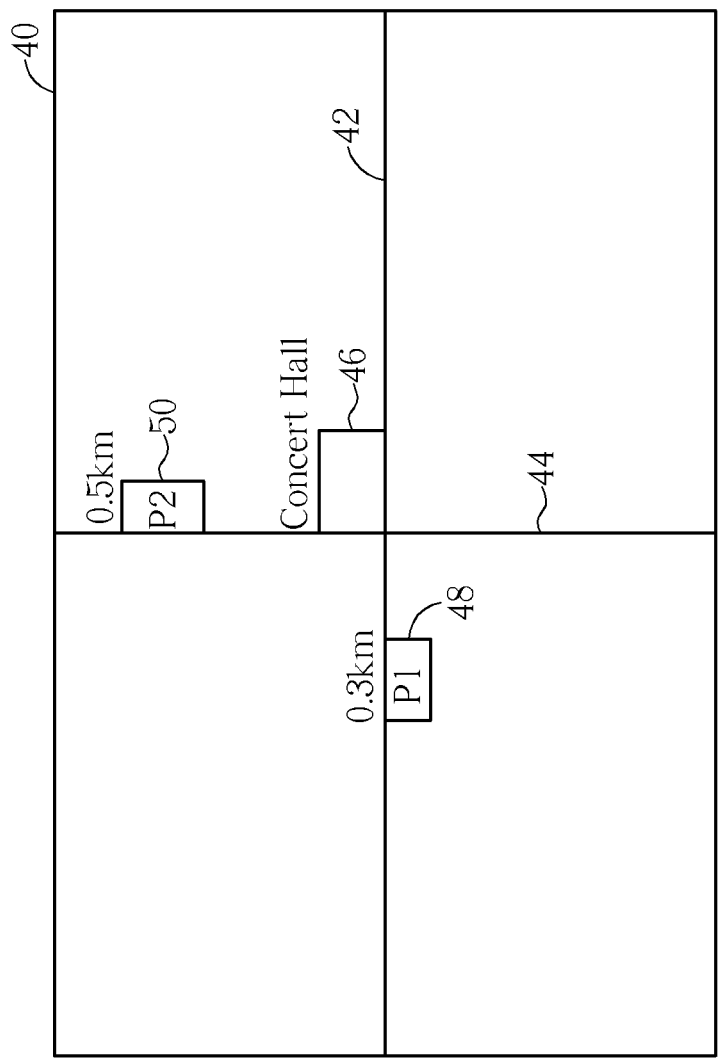
FIG. 3 shows a map containing a destination location as well as nearby parking areas.

When the user selects a destination location, such as the concert hall, the personal navigation device 10 will first determine if the concert hall is in an urban area. Once it is determined that the destination location is located in an urban area, the user is then asked if they would like to park nearby. For example, "Do you want parking with that?" can be asked. If the user indicates that they require parking, the nearest parking facility can be automatically selected or the user can be presented with a list of nearby parking areas. If the user is given a choice, the available parking areas can include all parking areas located within a specified radius of the destination location. Along with each parking area, the corresponding distance from each parking area to the destination location can also be shown. Alternatively, a map can be shown on the display 12 such as the map 40 shown in FIG. 3. The map 40 shows the concert hall 46 centered on the screen and located at the intersection of roads 42 and 44. Two parking areas 48 and 50 are shown near the concert hall 46, with parking area 48 shown as being 0.3 km away from the concert hall 46 and parking area 50 shown as being 0.5 km away from the concert hall 46. In this example, the concert hall 46 is the destination location, and icons for the concert hall 46 as well as the parking areas 48 and 50 are shown as being superimposed on the map 40. In addition to the map 40 showing the distances of the parking areas 48 and 50 as being 0.3 km and 0.5 km away from the concert hall, the distances shown on the map between the parking areas 48 and 50 and the concert hall 46 are directly proportional to the actual distances between these locations. Thus, the user is given sufficient information for selecting the best parking area for the current destination location.

Once a parking area has been selected, whether automatically or by the user, the selected parking area is then inserted into the route as an intermediate destination along the way to the destination location. The route to the selected parking area will be planned using driving instructions, and the route from the selected parking area to the destination location will be planned using walking instructions. In addition, an estimated time of arrival (ETA) can be calculated that considers both the driving time to the selected parking area and the walking time from the parking area to the destination location.

Figure 4:
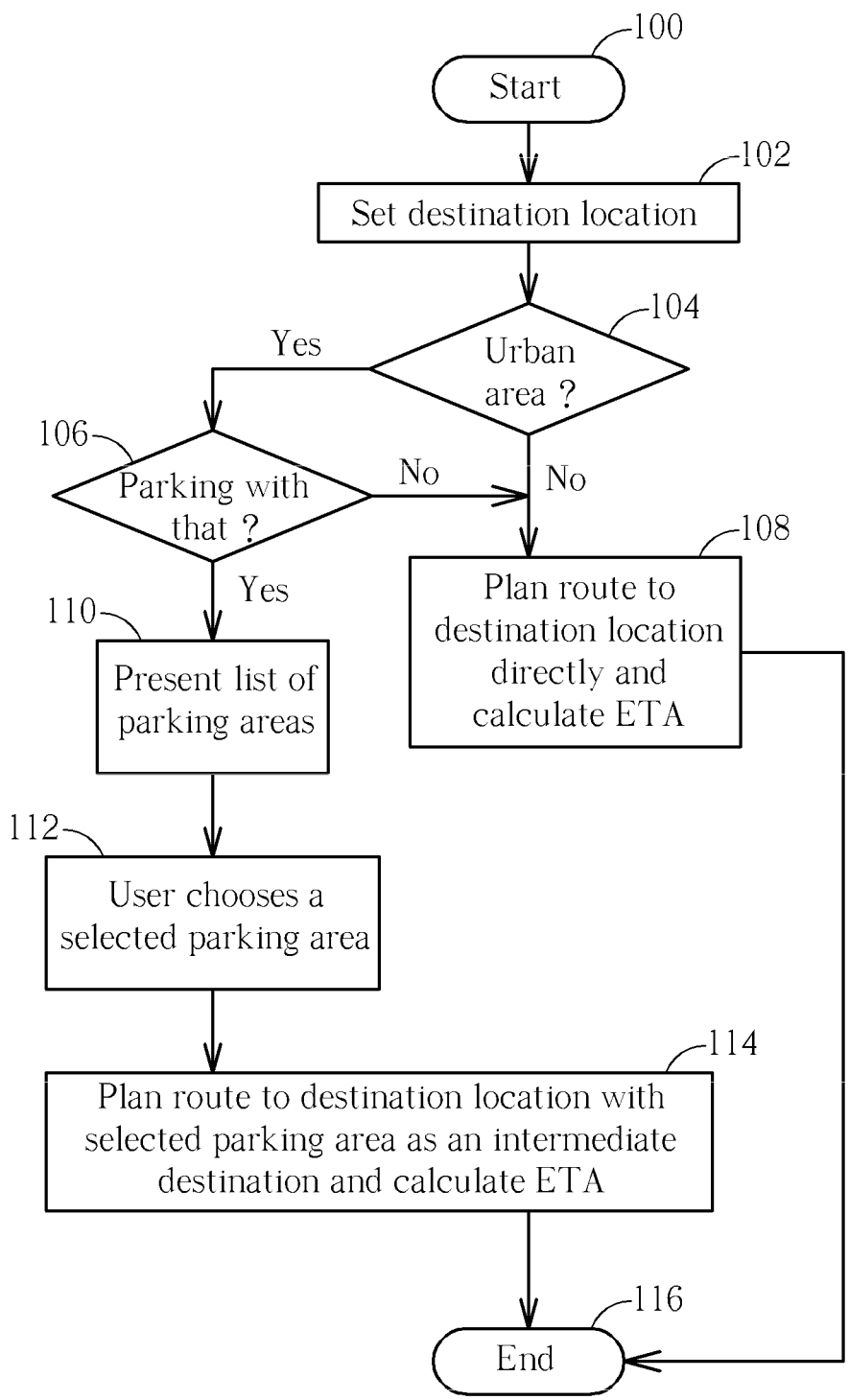
FIG. 4 is a flowchart illustrating the present invention method of assisting users with parking nearby a destination location.

Please refer to FIG. 4. FIG. 4 is a flowchart illustrating the present invention method of assisting users with parking nearby a destination location. Steps contained in the flowchart will be explained below.

Step 100: Start.

Step 102: The user sets the destination location in the personal navigation device 10.

Step 104: Upon receiving the destination location, the personal navigation device 10 determines if the destination location is located in an urban area. If so, go to step 106. If not, go to step 108.

Step 106: Since the destination location is located in an urban area, the user is asked if "parking with that" destination location will be required. If parking is required, go to step 110. If not, go to step 108.

Step 108: Since a special parking area is not required, a route is planned for the user to drive directly to the destination location. At the same time, an ETA to the destination location is calculated. Go to step 116.

Step 110: The user is presented with a list of parking areas nearby the destination location. Alternatively, the nearest parking area can be selected automatically for the user.

Step 112: The user chooses a selected parking area if it was not already selected automatically.

Step 114: A route is planned to the destination location by using the selected parking area as an intermediate destination. The route to the selected parking area will be planned using driving instructions and the route from the selected parking area to the destination location will be planned using walking instructions. An ETA to the destination location including the driving time and the walking time is calculated for the user.

Step 116: End.

In summary, the present invention provides a way to help users park their vehicles in urban areas where there may not be a parking area onsite. The personal navigation device can guide the user to the parking area and then guide the user on foot to the destination location from the parking area. In addition, an estimated time of arrival can be calculated that takes the walking time from the parking area to the destination location into account for providing users with a more accurate estimate of the total time needed to arrive at the destination location.

Those skilled in the art will readily observe that numerous modifications and alterations of the device and method may be made while retaining the teachings of the invention.

What is claimed is:

1. A method of assisting a user of a personal navigation device with parking nearby a destination location, the method comprising:
    receiving, through a user interface of the personal navigation device, instructions from the user to create navigation instructions to the destination location;
    determining, with routing software executed by a processor of the personal navigation device, if the destination location is in an urban area, wherein determining that the destination location is in the urban area is performed by determining that a number of streets within a predetermined radius of the destination location is greater than a threshold value;
    querying, with the user interface of the personal navigation device, whether the user requires parking only when the destination location is in the urban area, and selecting a parking area when the user requests parking; and
    after determining that the destination location is located in the urban area and the parking area has been selected, planning, with the routing software executed by the processor of the personal navigation device, a route to the destination location using the parking area as an intermediate destination.

2. The method of claim 1, wherein selecting the parking area when the user requests parking comprises:
    presenting a plurality of nearby parking areas to the user when the user requests parking; and
    receiving the user's choice of the parking area from the plurality of nearby parking areas presented to the user.

3. The method of claim 2, wherein presenting the plurality of nearby parking areas to the user when the user requests parking comprises presenting all parking areas within a predetermined radius of the destination location.

4. The method of claim 2, wherein presenting the plurality of nearby parking areas to the user when the user requests parking comprises presenting a list of parking areas along with a corresponding distance from each parking area to the destination location.

5. The method of claim 2, wherein presenting the plurality of nearby parking areas to the user when the user requests parking comprises presenting a map having a superimposed first icon representing the destination location and a plurality of superimposed second icons representing parking areas, wherein a distance on the map from each second icon to the first icon is directly proportional to the actual distance between the corresponding parking area and the destination location.

6. The method of claim 1, wherein planning the route comprises:
    creating a first leg of the route in which the user is given driving instructions to the intermediate destination; and
    creating a second leg of the route in which the user is given walking instructions from the intermediate destination to the destination location.

7. The method of claim 6 further comprising calculating an estimated time of arrival while considering a driving time to the intermediate destination and a walking time from the intermediate destination to the destination location.

8. A personal navigation device for assisting a user with parking nearby a destination location, the personal navigation device comprising:
    a map database comprising map and address data;
    routing software for receiving instructions from the user to create navigation instructions to the destination location and determining if the destination location is in an urban area, wherein determining that the destination location is in the urban area is performed by determining that a number of streets within a predetermined radius of the destination location is greater than a threshold value;
    a user interface for querying whether the user requires parking only when the destination location is in the urban area, and selecting a parking area when the user requests parking; and
    a processor for controlling operation of the personal navigation device, and after determining that the destination location is located in the urban area and the parking area has been selected, executing the routing software for planning a route to the destination location using the parking area as an intermediate destination.

9. The personal navigation device of claim 8, wherein selecting the parking area when the user requests parking comprises:
    presenting a plurality of nearby parking areas to the user when the user requests parking; and
    receiving the user's choice of the parking area from the plurality of nearby parking areas presented to the user.

10. The personal navigation device of claim 9, wherein presenting the plurality of nearby parking areas to the user when the user requests parking comprises presenting all parking areas within a predetermined radius of the destination location.

11. The personal navigation device of claim 9, wherein presenting the plurality of nearby parking areas to the user when the user requests parking comprises presenting a list of parking areas along with a corresponding distance from each parking area to the destination location.

12. The personal navigation device of claim 9, wherein presenting the plurality of nearby parking areas to the user when the user requests parking comprises presenting a map having a superimposed first icon representing the destination location and a plurality of superimposed second icons representing parking areas, wherein a distance on the map from each second icon to the first icon is directly proportional to the actual distance between the corresponding parking area and the destination location.

13. The personal navigation device of claim 8, wherein planning the route comprises:
    creating a first leg of the route in which the user is given driving instructions to the intermediate destination; and creating a second leg of the route in which the user is given walking instructions from the intermediate destination to the destination location.

14. The personal navigation device of claim 13, wherein the routing software calculates an estimated time of arrival while considering a driving time to the intermediate destination and a walking time from the intermediate destination to the destination location.

* * * * *